(12) United States Patent  (10) Patent No.: US 8,322,072 B2
Anderson  (45) Date of Patent: Dec. 4, 2012

(54) ROBOTIC WATERING UNIT

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/208,067

(22) Filed: Aug. 11, 2011

(65) Prior Publication Data

US 2011/0301755 A1  Dec. 8, 2011

Related U.S. Application Data

(62) Division of application No. 12/427,065, filed on Apr. 21, 2009, now Pat. No. 8,028,470.

(51) Int. Cl.
*A01G 25/09* (2006.01)

(52) U.S. Cl. ............................. 47/48.5; 47/79

(58) Field of Classification Search ............... 47/58.1 R, 47/79, 48.5, 21.1, 1.01 R, 1.5; 137/78.2, 137/78.3; 239/723, 172; 700/284, 283
See application file for complete search history.

(56) References Cited

U.S. PATENT DOCUMENTS

| | | |
|---|---|---|
| 3,674,652 A | 7/1972 | Brown |
| 3,931,413 A | 1/1976 | Frick et al. |
| 4,067,714 A | 1/1978 | Willard, Sr. |
| 4,083,494 A | 4/1978 | Ballu |
| 4,146,383 A | 3/1979 | Hanway et al. |
| 4,150,970 A | 4/1979 | Ries et al. |
| 4,175,394 A | 11/1979 | Wiesboeck |
| 4,286,530 A | 9/1981 | Conley |
| 4,315,599 A | 2/1982 | Biancardi |
| 4,342,176 A | 8/1982 | Wolfe |
| 4,358,054 A | 11/1982 | Ehrat |
| 4,385,500 A | 5/1983 | Kjelgaard et al. |
| 4,398,384 A | 8/1983 | Klinner |
| 4,433,552 A | 2/1984 | Smith |
| 4,516,723 A | 5/1985 | Hesse |
| 4,588,127 A | 5/1986 | Ehrat |
| 4,638,594 A | 1/1987 | Huguet et al. |
| 4,704,986 A | 11/1987 | Remp et al. |
| 4,757,688 A | 7/1988 | Basiulis et al. |
| 4,832,263 A | 5/1989 | Poynor |
| 4,871,447 A | 10/1989 | Adamache |
| 4,903,903 A | 2/1990 | Benen |
| 4,949,656 A | 8/1990 | Lyle et al. |

(Continued)

FOREIGN PATENT DOCUMENTS

DE  3830647 A1  3/1990

(Continued)

OTHER PUBLICATIONS

European Search Report regarding Application No. 11170005.0-2313, dated Oct. 25, 2011, 8 pages.

(Continued)

*Primary Examiner* — T. Nguyen
(74) *Attorney, Agent, or Firm* — Yee & Associates, P.C.; Jeremy J. Westlake

(57) ABSTRACT

The different illustrative embodiments provide a method and system for watering plants. A map of an area is received and a determination is made using a processing unit as to whether the area needs water. If the area needs water, current constraints are identified and a determination is made using the processing system as to whether the current constraints allow for watering. If the current constraints allow for watering, a watering solution application plan is generated using the processing system, and the watering solution application plan is executed using a mobile utility vehicle.

7 Claims, 8 Drawing Sheets

U.S. PATENT DOCUMENTS

| | | | |
|---|---|---|---|
| 4,970,973 A | 11/1990 | Lyle et al. |
| 4,982,898 A | 1/1991 | Ballu |
| 4,992,942 A | 2/1991 | Bauerle et al. |
| 5,076,497 A | 12/1991 | Rabitsch |
| 5,092,422 A | 3/1992 | Hood et al. |
| 5,140,917 A | 8/1992 | Swanson |
| 5,248,090 A | 9/1993 | Williamson |
| 5,255,857 A | 10/1993 | Hunt |
| 5,355,815 A | 10/1994 | Monson |
| 5,442,552 A | 8/1995 | Slaughter et al. |
| 5,601,236 A | 2/1997 | Wold |
| 5,740,038 A | 4/1998 | Hergert |
| 5,840,102 A | 11/1998 | McCracken |
| 5,870,302 A | 2/1999 | Oliver |
| 5,884,224 A | 3/1999 | McNabb et al. |
| 5,902,343 A | 5/1999 | Hale et al. |
| 5,907,925 A | 6/1999 | Guyot |
| 5,913,915 A | 6/1999 | McQuinn |
| 5,915,313 A | 6/1999 | Bender et al. |
| 5,919,242 A | 7/1999 | Greatline et al. |
| 5,924,371 A | 7/1999 | Flamme et al. |
| 5,927,603 A | 7/1999 | McNabb |
| 5,979,703 A | 11/1999 | Nystrom |
| 5,991,687 A | 11/1999 | Hale et al. |
| 5,995,895 A | 11/1999 | Watt et al. |
| 6,039,212 A | 3/2000 | Singh |
| 6,079,340 A | 6/2000 | Flamme et al. |
| 6,089,743 A | 7/2000 | McQuinn |
| 6,116,519 A | 9/2000 | Williamson |
| 6,122,581 A | 9/2000 | McQuinn |
| 6,129,520 A | 10/2000 | Cooper |
| 6,141,614 A | 10/2000 | Janzen et al. |
| 6,178,253 B1 | 1/2001 | Hendrickson et al. |
| 6,199,000 B1 | 3/2001 | Keller et al. |
| 6,230,091 B1 | 5/2001 | McQuinn |
| 6,337,971 B1 | 1/2002 | Abts |
| 6,443,365 B1 | 9/2002 | Tucker et al. |
| 6,510,367 B1 | 1/2003 | McQuinn |
| 6,516,271 B2 | 2/2003 | Upadhyaya et al. |
| 6,549,851 B2 | 4/2003 | Greensides |
| 6,553,299 B1 | 4/2003 | Keller et al. |
| 6,574,979 B2 | 6/2003 | Faqih |
| 6,596,996 B1 | 7/2003 | Stone et al. |
| 6,597,991 B1 | 7/2003 | Meron et al. |
| 6,616,374 B2 | 9/2003 | Starr |
| 6,666,384 B2 | 12/2003 | Prandi |
| 6,671,698 B2 | 12/2003 | Pickett et al. |
| 6,684,648 B2 | 2/2004 | Faqih |
| 6,691,135 B2 | 2/2004 | Pickett et al. |
| 6,755,362 B2 | 6/2004 | Krieger et al. |
| 6,778,887 B2 | 8/2004 | Britton |
| 6,792,395 B2 | 9/2004 | Roberts |
| 6,802,153 B2 | 10/2004 | DuBois et al. |
| 6,854,209 B2 | 2/2005 | Van Horssen et al. |
| 6,862,083 B1 | 3/2005 | McConnell et al. |
| 6,877,325 B1 | 4/2005 | Lawless |
| 6,907,319 B2 | 6/2005 | Hoelscher et al. |
| 6,928,339 B2 | 8/2005 | Barker |
| 6,941,225 B2 | 9/2005 | Upadhyaya et al. |
| 6,963,881 B2 | 11/2005 | Pickett et al. |
| 6,975,245 B1 | 12/2005 | Slater et al. |
| 6,978,794 B2 | 12/2005 | Dukes et al. |
| 7,063,276 B2 | 6/2006 | Newton |
| 7,069,692 B2 | 7/2006 | Kuiper et al. |
| 7,089,763 B2 | 8/2006 | Forsberg et al. |
| 7,171,912 B2 | 2/2007 | Fraisse et al. |
| 7,182,274 B2 | 2/2007 | Nies |
| 7,182,445 B2 | 2/2007 | Johnson et al. |
| 7,275,042 B1 | 9/2007 | Kelly et al. |
| 7,280,892 B2 | 10/2007 | Bavel |
| 7,317,972 B2 | 1/2008 | Addink et al. |
| 7,343,262 B2 | 3/2008 | Baumgarten et al. |
| 7,408,145 B2 | 8/2008 | Holland |
| 7,455,245 B2 | 11/2008 | Sipinski et al. |
| 7,469,707 B2 | 12/2008 | Anderson et al. |
| 7,565,139 B2 | 7/2009 | Neven, Sr. et al. |
| 7,577,105 B2 | 8/2009 | Takeyoshi et al. |
| 7,610,122 B2 | 10/2009 | Anderson |
| 7,617,992 B2 | 11/2009 | Ivans |
| 7,686,499 B2 | 3/2010 | Dykstra et al. |
| 7,775,168 B2 | 8/2010 | Sidhwa et al. |
| 7,805,221 B2 | 9/2010 | Nickerson |
| 7,809,475 B2 | 10/2010 | Kaprielian |
| 7,844,368 B2 | 11/2010 | Alexanian |
| 7,854,108 B2 | 12/2010 | Koselka et al. |
| 7,930,085 B2 | 4/2011 | Anderson et al. |
| 7,957,850 B2 | 6/2011 | Anderson |
| 8,028,470 B2 | 10/2011 | Anderson |
| 8,150,554 B2 | 4/2012 | Anderson |
| 8,170,405 B2 | 5/2012 | Harris |
| 2002/0011075 A1 | 1/2002 | Faqih |
| 2002/0170229 A1 | 11/2002 | Ton et al. |
| 2003/0019408 A1 | 1/2003 | Fraisse et al. |
| 2003/0215354 A1 | 11/2003 | Clark et al. |
| 2003/0229434 A1 | 12/2003 | Miedema |
| 2004/0034459 A1 | 2/2004 | Hoelscher et al. |
| 2004/0078092 A1 | 4/2004 | Addink et al. |
| 2004/0231240 A1 | 11/2004 | Kuiper et al. |
| 2005/0129034 A1 | 6/2005 | Takeyoshi et al. |
| 2005/0187665 A1 | 8/2005 | Fu |
| 2005/0199842 A1 | 9/2005 | Parsons et al. |
| 2006/0026556 A1 | 2/2006 | Nishimura |
| 2006/0089260 A1 | 4/2006 | Di et al. |
| 2007/0042803 A1 | 2/2007 | Anderson |
| 2007/0220808 A1 | 9/2007 | Kaprielian et al. |
| 2008/0061163 A1 | 3/2008 | Kubby et al. |
| 2008/0097653 A1 | 4/2008 | Kaprielian et al. |
| 2008/0190020 A1 | 8/2008 | Todd |
| 2008/0288116 A1 | 11/2008 | Nickerson |
| 2009/0001193 A1 | 1/2009 | Parsons et al. |
| 2009/0019826 A1 | 1/2009 | Rigney |
| 2009/0179165 A1 | 7/2009 | Parsons et al. |
| 2009/0241580 A1 | 10/2009 | Hill et al. |
| 2009/0259483 A1 | 10/2009 | Hendrickson et al. |
| 2009/0281672 A1 | 11/2009 | Pourzia |
| 2009/0314862 A1 | 12/2009 | Bauman et al. |
| 2010/0032495 A1 | 2/2010 | Abts |
| 2010/0034466 A1 | 2/2010 | Jing et al. |
| 2010/0109946 A1 | 5/2010 | Pande |
| 2010/0243754 A1 | 9/2010 | Harris |
| 2010/0263275 A1 | 10/2010 | Anderson |
| 2010/0268390 A1 | 10/2010 | Anderson |
| 2010/0268391 A1 | 10/2010 | Anderson |
| 2010/0268562 A1 | 10/2010 | Anderson |
| 2010/0268679 A1 | 10/2010 | Anderson |
| 2010/0313799 A1 | 12/2010 | Sidhwa et al. |
| 2010/0332475 A1 | 12/2010 | Birdwell et al. |
| 2011/0089260 A1 | 4/2011 | Van Roemburg |
| 2011/0313577 A1 | 12/2011 | Anderson |
| 2012/0042563 A1 | 2/2012 | Anderson |
| 2012/0046790 A1 | 2/2012 | Anderson |
| 2012/0046837 A1 | 2/2012 | Anderson |
| 2012/0150355 A1 | 6/2012 | Anderson |

FOREIGN PATENT DOCUMENTS

| | | |
|---|---|---|
| DE | 4413739 A1 | 10/1995 |
| DE | 10002880 C1 | 6/2001 |
| DE | 10178747 A1 | 4/2003 |
| DE | 10221948 A1 | 11/2003 |
| EP | 2243353 A1 | 10/2010 |
| EP | 2423860 A2 | 2/2012 |
| EP | 2426628 A2 | 3/2012 |
| GB | 1597988 | 9/1981 |
| GB | 1603661 | 11/1981 |
| GB | 2462720 A | 2/2010 |
| WO | 023222 A1 | 4/2002 |
| WO | 2006060854 A1 | 6/2006 |
| WO | 2009059373 A1 | 5/2009 |

OTHER PUBLICATIONS

Gwatipedza et al., "A General Monopolistic competition Economic Model of Horticultural industry with a Risk of Invasion," Dec. 6, 2007, 27 pages.

Perret et al.,"Humidification-Dehumidification System in a Greenhouse for Sustainable Crop Production," Ninth International Water Technology Conference, IWTC9 2005, Sharm El-Sheikh, Egypt, Biosystems Engineering, Academic Press, 91(3):849-862, Jul. 2005.

U.S. Appl. No. 12/817,638, filed Jun. 17, 2010, Anderson.

"The AW-5000-MC", retrieved Feb. 12, 2010. http://www.airwatercorp.com/.

Hardaker et al., "Assesment of the Output of a Stochastic Decision Model", Austrialian Journal of Agricultural Economics, vol. 17, No. 3, Dec. 1973.

Flynn, "A Decision Model for Resource Management Using Rule-Based Utility Functions and Parameter Selection, a Dissertation", The Ohio State University, 1988.

Prasad et al., "A Study on Various Expert Systems in Agriculture", Georgian Electronic Scientific Journal, No. 4, (11) 2006.

Munoz et al., "Automatic Irrigation Based on Soil Moisture for Vegetable Crops", University of Florida, IFAS extension 2006.

Romero, "Risk Programming for Agricultural Resource Allocation—a Multidimensional Risk Approach", JC Baltzer AG Science Publishers, Annals of Operation Research 94 (2000).

European Office Action regarding European Application No. 10 160 613.5-2313, dated Mar. 29, 2012, 4 pages.

"Google Goggles (Labs): Overview," http://google.com/support/mobile/.../answer.p . . . , Jun. 1, 2010, 2 pages.

Chesmore, "The Automated Identification of Taxa: Concepts and Applications," In: Automated Taxon Identification Systematics: Theory, Approaches and Applications, McLeod (Ed.), CRC Press, Boca Raton, Florida, pp. 83-100, Jul. 23, 2007.

Eisenberg, "Digital Field Guides Eliminate the Guesswork," The New York Times, May 10, 2009, 2 pages.

El-Helly et al., "Integrating Diagnostic Expert System with Image Processing via Loosely Coupled Technique," INFOS2004, The 2nd International Conference on Informatics and Systems, Cairo, Egypt, Mar. 6-8, 2004, 15 pages.

Fleurat-Lessard et al., "Acoustic Detection and Automatic Identification of Insect Stages Activity in Grain Bulks by Noise Spectra Processing Through Classification Algorithms," 9th International Working Conference on Stored Product Protection, Sao Paulo, Brazil, Oct. 15-18, 2006, 11 pages.

Garcia, "Eavesdropping on Insects in Soil and Plants," U.S. Department of Agriculture, Agricultural Research Service, Jan. 5, 2001, (last modified Jul. 10, 2012), 1 page.

Griepentrog et al., "Autonomous Systems for Plant Protection," In: Precision Crop Protection—The Challenge and Use of Heterogeneity, Oerke et al. (Eds.), Springer Netherlands, New York, New York, pp. 323-333, Aug. 2010.

Muselli et al., "Dew Water Collector for Potable Water in Ajaccio (Corsica Island, France)," Atmospheric Research, 64:297-312, 2002.

Pande et al., "mKRISHI: A Mobile Multimedia Agro Advisory System for Remote Rural Farmers," http://www.ics.uci.edu/jain/papers/ACM_mm09_mKRISHI_non_blind.pdf, Apr. 20, 2009, 12 pages.

Pontikakos et al., "Location-Aware System for Olive Fruit Fly Spray Control," Computers and Electronics in Agriculture, 70:355-368, 2010.

Potamitis et al., "On Automatic Bioacoustic Detection of Pests: The Cases of *Rhynchophorus ferrugineus* and *Sitophilus oryzae*," Journal of Economic Entomology, 102(4):1681-1690, Aug. 2009.

Schwartz, "Engineer Uses Solar Energy, Wax, and Human Sweat to Fight Malaria," http://cleantechnica.com/2009/01/31/engineer-uses-solar-energy-wax-and-human-sweat-to-fight-malaria/, Jan. 31, 2009, 3 pages.

Sim et al., "Implementation of an XML-based Multimedia Pests Information System for USN Environment," Proceedings of the 10th ACIS International Conference on Software Engineering, Artificial Intelligences, Networking and Parallel/Distributed Computing, pp. 597-601, May 27, 2009.

Tomasini, "Insect (Adult and Larva) Detection Equipment in Stored Grain—EWD Technology," EWD Training Seminar Lite, Saint-Chamas/Carqueiranne, France, May 10-11, 2004, 8 pages.

Woodford, "Connectionist-Based Intelligent Information Systems for Image Analysis and Knowledge Engineering: Applications in Horticulture," Thesis, The University of Otago, Dunedin, New Zealand, pp. 1-9, Dec. 11, 2003.

"Google Goggles," YouTube, www.youtube.com/watch?v=Hh, accessed Jul. 19, 2010, 2 pages.

European Search Report regarding European Application No. 11176681.2, dated Jun. 6, 2012, 8 pages.

European Search Report regarding European Application No. 11176689.5, dated Jun. 14, 2012, 10 pages.

European Search Report regarding European Application No. 11176697.8, dated Dec. 22, 2011, 7 pages.

ROBOTIC WATERING UNIT

This application is a divisional of application Ser. No. 12/427,065, filed Apr. 21, 2009 now U.S. Pat. No. 8,028,470, status allowed.

CROSS REFERENCE TO RELATED APPLICATIONS

This application is related to commonly assigned and co-pending U.S. patent application Ser. No. 12/427,051 entitled "A Method for Providing an Application to Plants"; U.S. patent application Ser. No. 12/427,059 entitled "Horticultural Knowledge Base for Managing Yards and Gardens"; U.S. patent application Ser. No. 12/427,076 entitled "Resource Use Management"; U.S. patent application Ser. No. 12/427,043 entitled "System and Method for Managing Resource Use" all of which are hereby incorporated by reference.

FIELD OF THE INVENTION

The present invention relates generally to an irrigation control system and, more particularly, to a system and method for watering plants in yards and gardens.

BACKGROUND OF THE INVENTION

Irrigation is typically used to water large, homogeneous areas such as fields, lawns, and gardens. The water is assumed to be available from a single source, such as a well, canal, or municipal water system. Water from municipal water systems are often stressed during times of heat and drought, and watering restrictions are frequently implemented to provide adequate water for higher priority uses. These restrictions may start as odd-even day lawn watering and progress to complete bans on lawn watering, and finally to complete bans on garden watering.

The fields and lawns typically have a single species of plant and water application is based on water sensors, evapotranspiration models, or rules. This type of irrigation system can be inadequate for yards and gardens where numerous species are growing in close proximity, particularly large water users like trees and shrubs in proximity to lesser water users. Trees, shrubs, and structures also provide shade, which impacts evapotranspiration, which is the sum of evaporation and plant transpiration.

SUMMARY

An embodiment of the present invention provides a method and system for watering plants. A map of an area is received and a determination is made using a processing unit as to whether the area needs water. If the area needs water, current constraints are identified and a determination is made using the processing system as to whether the current constraints allow for watering. If the current constraints allow for watering, a water application plan is generated using the processing system, and the water application plan is executed using a mobile utility vehicle.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
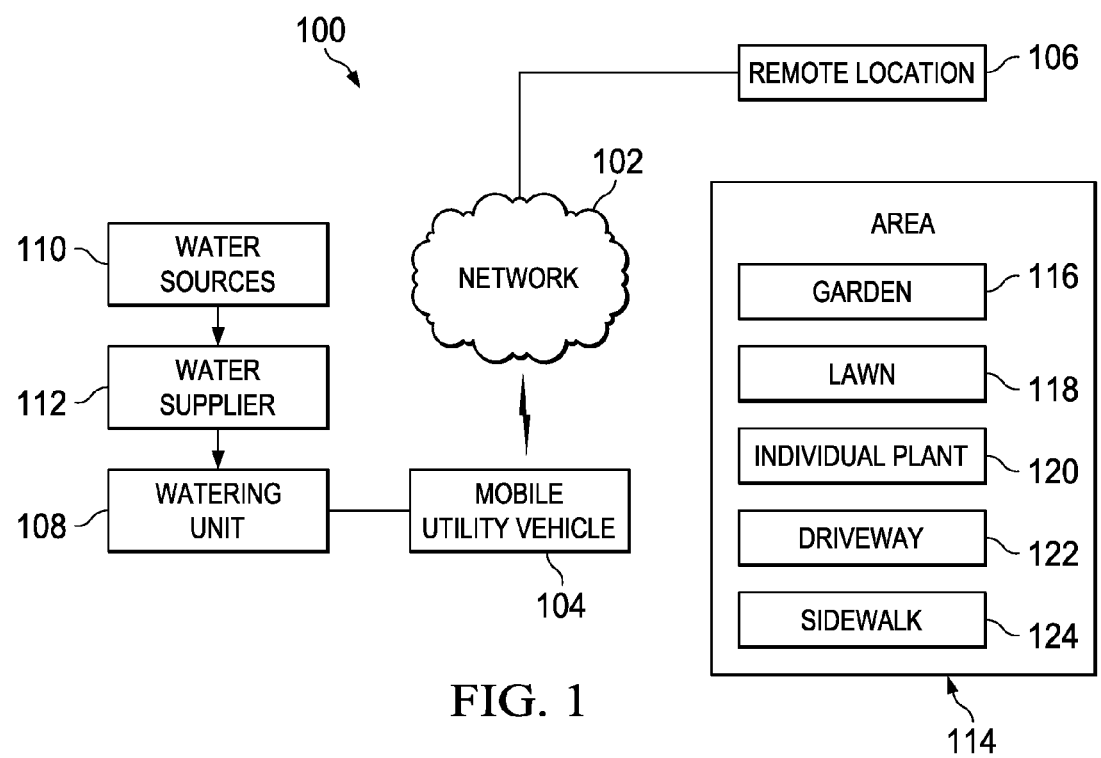
FIG. 1 is a block diagram of a robotic watering system in which an illustrative embodiment may be implemented.

FIG. 1 is a block diagram of a robotic watering system in which an illustrative embodiment may be implemented. Robotic watering system 100 may be implemented in a network of computers in which the illustrative embodiments may be implemented. Robotic watering system 100 contains network 102, which is the medium used to provide communications links between various devices and computers connected together within robotic watering system 100, such as mobile utility vehicle 104, remote location 106 and watering unit 108. Network 102 may include connections, such as wire, wireless communication links, or fiber optic cables.

In the depicted example, mobile utility vehicle 104 connects to network 102 in a wireless configuration while remote location 106 has a hard connection to network 102. In another illustrative embodiment, both mobile utility vehicle 104 and remote location 106 may connect to network 102 in a wireless configuration. Remote location 106 may be, for example, personal computers or network computers. In one illustrative example, remote location 106 provides data, such as boot files, operating system images, and applications, to mobile utility vehicle 104. Mobile utility vehicle 104 is a client to remote location 106 in this example. Watering unit 108 may be integrated with mobile utility vehicle 104 in one illustrative embodiment, or may be capable of being affixed to mobile utility vehicle 104 in another illustrative embodiment. Water use management system 100 may include additional servers, clients, and other devices not shown.

Water use management system 100 includes water sources 110, water supplier 112, and area 114. Water sources 110 is an illustrative example of a source of watering solution that mobile utility vehicle 104 can draw upon in providing watering solution to a number of plants in an area, such as area 114. Water sources 110 may include sources such as, for example, without limitation, municipal water, well water, reservoir water, and the like. In an illustrative example, water sources 110 may be an in-ground rainwater tank used for retention of stormwater. In another illustrative embodiment, water sources 110 may be well water accessed from a well that is an excavation or structure created in the ground to access water in underground aquifers. In one illustrative embodiment, well water may be accessed by an electric submersible pump or a mechanical pump used to draw water up to the surface. In another illustrative example, well water may be accessed from a storage tank with a pressure system or a cistern along with a small second pump. In yet another illustrative embodiment, water sources 110 may be municipal water that is water supplied by the water supply network of a local community, county, and/or municipality.

Water supplier 112 is an illustrative example of a device that carries watering solution from the source of the watering solution to watering unit 108. Water supplier 112 may be, for example, without limitation, a hose connected to one of water sources 110, an on-board tank associated with watering unit 108 and/or mobile utility vehicle 104, a towed tank associated with watering unit 108 and/or mobile utility vehicle 104, and/or any other suitable device for carrying watering solution from a source to a watering unit capable of distributing the watering solution across area 114.

Area 114 includes garden 116, lawn 118, individual plant 120, driveway 122, and sidewalk 124. Area 114 is any location in which a number of plants may be located. Area 114 may be, for example, a flowerbed, garden, yard, lawn, landscape, park, field, green, or any other area of recreational or amenity land planted with grass and/or other plants. Area 114 may be contiguous or non-contiguous.

Garden 116 may include a number of plants. As used herein, a number refers to one or more plants. The number of plants may be homogenous or heterogeneous plant varieties and/or species. In an illustrative embodiment, garden 116 may contain a number of plants such as, for example, without limitation, trees, herbs, bushes, grasses, vines, ferns, mosses, flowering plants, bryophytes, metaphytes, and the like.

Lawn 118 may be any area of recreational or amenity land planted with grass and/or other plants. In one illustrative embodiment, lawn 118 may be maintained at a low, even height. Lawn 118 may include, for example, without limitation, turf, pitch, field, green, and the like.

Individual plant 120 may be a number of plants grouped together and/or dispersed throughout area 114. As used herein, a number refers to one or more individual plants. Individual plant 120 may be any type of plant such as, for example, without limitation, trees, herbs, bushes, grasses, vines, ferns, mosses, flowering plants, bryophytes, metaphytes, and the like. In an illustrative embodiment, individual plant 120 may be within a section of garden 116 or within a section of lawn 118. In another illustrative embodiment, individual plant 120 may be distinct from garden 116 and/or lawn 118. For example, in one illustrative embodiment, individual plant 120 may be an orchard of trees. In another illustrative embodiment, individual plant 120 may be a potted plant, climbing plant, or hanging plant, for example.

Driveway 122 is any type of private road for local access to one or a small group of structures. Driveway 122 may be composed of, for example, without limitation, concrete, decorative brick, cobblestone, asphalt, decomposed granite, and various materials in alternation with grass and/or other plants. In an illustrative embodiment, driveway 122 may be adjacent to lawn 118 and garden 116 as part of a landscape of a home or business, for example.

Sidewalk 124 may be any type of path for pedestrians. Sidewalk 124 may be alongside a road, driveway 122, lawn 118, garden 116, or individual plant 120, for example. Sidewalk 124 may be composed of, for example, without limitation, concrete, decorative brick, cobblestone, asphalt, decomposed granite, and various materials in alternation with grass and/or other plants. In an illustrative embodiment, sidewalk 124 may be a path that cuts through a section of lawn 118 and/or garden 116. In another illustrative embodiment, sidewalk 124 may be a path adjacent to individual plant 120.

In one illustrative embodiment, garden 116, lawn 118, individual plant 120, driveway 122, and sidewalk 124 may be grouped together in homogenous groupings, or may be grouped together in heterogeneous groupings. In another illustrative embodiment, garden 116, lawn 118, individual plant 120, driveway 122, and sidewalk 124 may be grouped together in a dense arrangement, or may be spaced apart in any number of arrangements and distances.

The illustration of robotic watering system 100 in FIG. 1 is not meant to imply physical or architectural limitations on the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative embodiments a set of mobile utility vehicles may be used in addition to mobile utility vehicle 104. In another illustrative example, water sources 110 may contain additional sources such as, for example, without limitation, fertilizer, herbicide, insecticide, fungicide, plant food, and other substances used in plant care and maintenance. As used herein, watering solution refers to water and/or other substances that may be applied to plants, such as garden 116, lawn 118, and individual plant 120. Other substances may be, for example, without limitation, fertilizer, herbicide, insecticide, fungicide, plant food, and the like.

Figure 2:
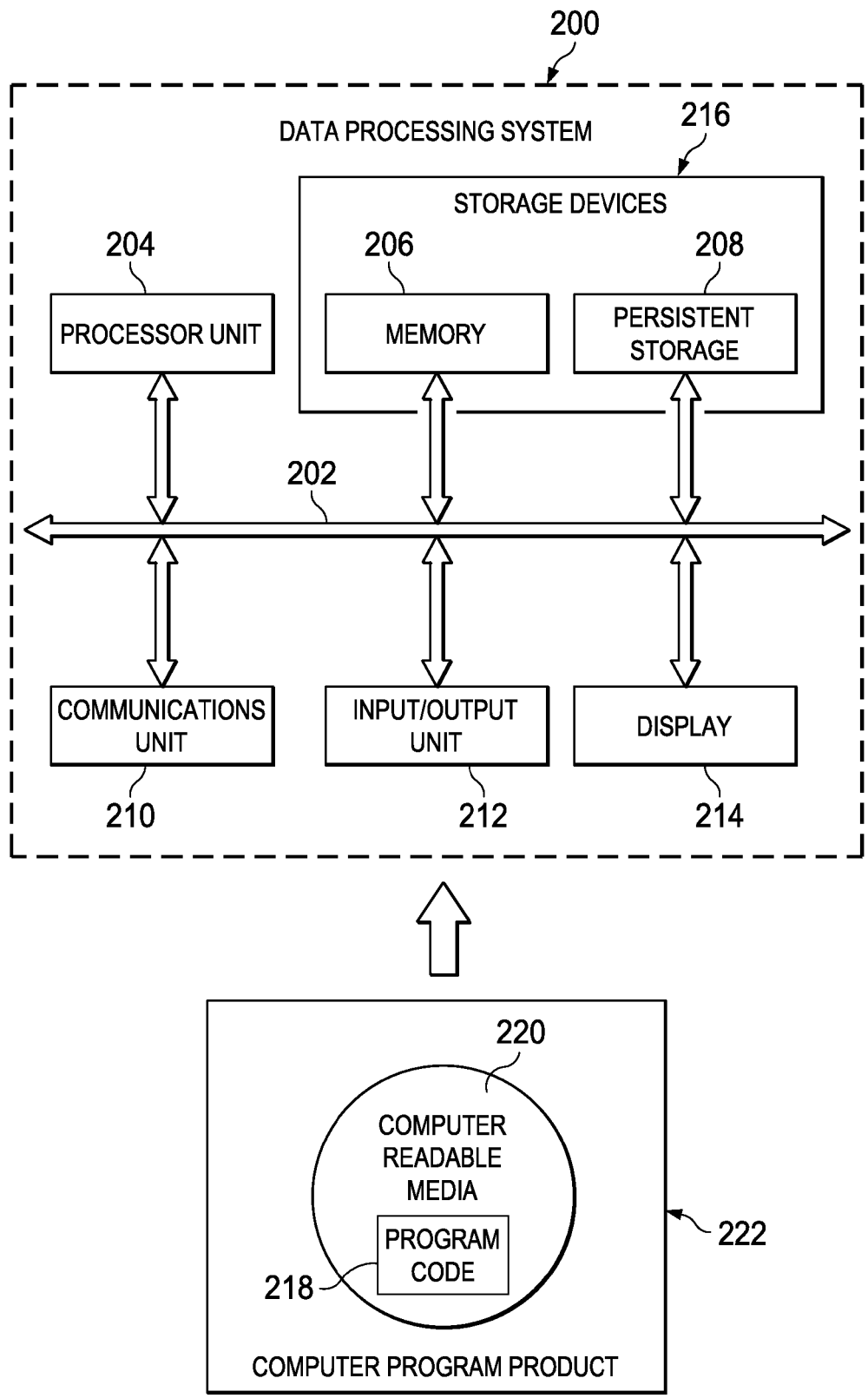
FIG. 2 is a block diagram of a data processing system in accordance with an illustrative embodiment.

With reference now to FIG. 2, a block diagram of a data processing system is depicted in accordance with an illustrative embodiment. Data processing system 200 is an example of a computer, such as remote location 106 or mobile utility vehicle 104 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer recordable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

Figure 3:
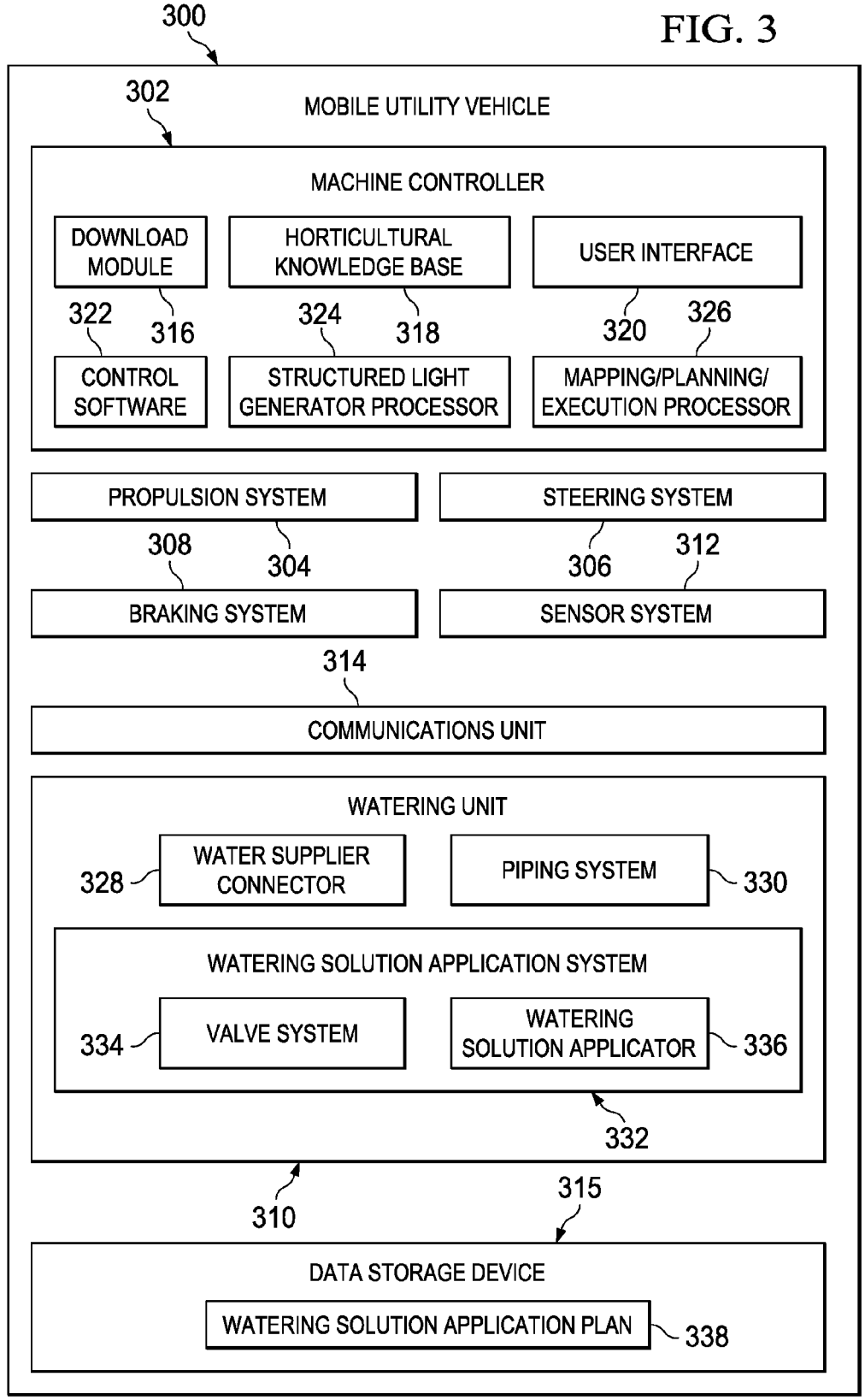
FIG. 3 is a block diagram of a mobile utility vehicle in accordance with an illustrative embodiment.

With reference now to FIG. 3, a block diagram of a mobile utility vehicle is depicted in accordance with an illustrative embodiment. Mobile utility vehicle 300 is an example of one implementation for mobile utility vehicle 104 in FIG. 1.

As illustrated, mobile utility vehicle 300 includes machine controller 302, propulsion system 304, steering system 306, braking system 308, watering unit 310, sensor system 312, communications unit 314, and data storage device 315.

Machine controller 302 includes download module 316, horticultural knowledge base 318, user interface 320, control software 322, structured light generator processor 324, and mapping/planning/execution processor 326. Machine controller 302 may be, for example, a data processing system, such as data processing system 200 in FIG. 2, or some other device that may execute processes to control movement of mobile utility vehicle 300. Machine controller 302 may be, for example, a computer, an application integrated specific circuit, and/or some other suitable device. Different types of devices and systems may be used to provide redundancy and fault tolerance.

Machine controller 302 may execute processes using control software 322 to control propulsion system 304, steering system 306, and braking system 308 to control movement of mobile utility vehicle 300. Machine controller 302 may execute processes using control software 322 to control watering unit 310 and sensor system 312 to control water acquisition and application by mobile utility vehicle 300. Machine controller 302 may send various commands to these components to operate the mobile utility vehicle in different modes of operation. These commands may take various forms depending on the implementation. For example, the commands may be analog electrical signals in which a voltage and/or current change is used to control these systems. In other implementations, the commands may take the form of data sent to the systems to initiate the desired actions.

Download module 316 provides for updates of horticultural knowledge base 318 through a control system or remote location, such as remote location 106 in FIG. 1. Download module 316 may also provide mobile utility vehicle 300 access to per plant prescriptions, and other information located at a remote location, such as remote location 106 in FIG. 1.

Horticultural knowledge base 318 contains information about the operating environment, such as, for example, a geo-referenced map showing the landscape, structures, tree locations, flowerbed locations, individual plant locations, driveway locations, sidewalk locations, and other static object locations. Horticultural knowledge base 318 may also contain information, such as, without limitation, plant species and varieties located in the operating environment, information about the water needs, growth stages, and life cycles of the plant species and varieties located in the operating environment, current weather for the operating environment, weather history for the operating environment, specific environmental features of the operating environment that affect mobile utility vehicle 300, and the like. The information in horticultural knowledge base 318 may be used to perform classification and plan actions. Horticultural knowledge base 318 may be located entirely in mobile utility vehicle 300 or parts or all of horticultural knowledge base 318 may be located in a remote location, such as remote location 106 in FIG. 1, which is accessed by mobile utility vehicle 300.

User interface 320 may be, in one illustrative embodiment, presented on a display monitor mounted on a side of mobile utility vehicle 300 and viewable by an operator. User interface 320 may display sensor data from the environment surrounding mobile utility vehicle 300, as well as messages, alerts, and queries for the operator. In other illustrative embodiments, user interface 320 may be presented on a remote display held by an operator or located in a remote location, such as remote location 106 in FIG. 1.

Structured light generator processor 324 may be used to monitor the water supplier, such as water supplier 112 in FIG. 1, connected to watering unit 310, such as a hose running from a watering solution supply source to water supplier connector 328, for example. The water supplier must be dragged with mobile utility vehicle 300 without getting tangled around mobile utility vehicle 300 and/or wrapped around objects in the area. Objects in the area may include objects such as, without limitation, trees, fences, playground equipment, light poles, fire hydrants, and/or any other object that may be present in the area being watered by mobile utility vehicle 300. As such, mobile utility vehicle 300 may need to monitor and manage the path of the water supplier, such as a hose for example. Monitoring and managing the path of the water supplier may include observing the current location of the water supplier relative to the current location of mobile utility vehicle 300, identifying where mobile utility vehicle 300 needs to go next, and planning a route to the next location that keeps the water supplier traveling freely along with mobile utility vehicle 300.

In the illustrative example of a hose, tall grass may obscure the hose and introduce difficulty in monitoring and managing the path of the hose. Mitigations to this problem may include, for example, without limitation, making the hose a contrasting color to the grass, mounting a camera on mobile utility vehicle 300 and transmitting a worksite image including the hose and mobile utility vehicle 300 to a remote location, such as remote location 106, and using structured light to identify the hose. In the illustrative example of a hose, structured light generator processor 324 may be used to monitor the hose by using structured light to identify the smooth hose in the rough textured grass, for example.

Mapping/planning/execution processor 326 may use the full capabilities of a computer, such as data processing system 200 in FIG. 2, including internet access, to develop watering solution application plans, as well as supporting user interface 320. Watering solution application plans may include features such as, without limitation, automated compliance with community watering restrictions obtained via a central web site or local user input, use of observations from structured light generator processor 324 to indicate evapo-transpiration data, use of observations from structured light generator processor 324 to adhere to plant and soil models and implement site specific and time specific water application, path planning that considers routing of the water supplier connected to watering unit 310, real-time path updates based on desired water source position relative to actual water source position, and the like.

In these examples, propulsion system 304 may propel or move mobile utility vehicle 300 in response to commands from machine controller 302. Propulsion system 304 may maintain or increase the speed at which a mobile utility vehicle moves in response to instructions received from machine controller 302. Propulsion system 304 may be an electrically controlled propulsion system. Propulsion system 304 may be, for example, an internal combustion engine, an internal combustion engine/electric hybrid system, an electric engine, or some other suitable propulsion system.

Steering system 306 may control the direction or steering of mobile utility vehicle 300 in response to commands received from machine controller 302. Steering system 306 may be, for example, an electrically controlled hydraulic steering system, an electrically driven rack and pinion steering system, an Ackerman steering system, a skid-steer steering system, a differential steering system, or some other suitable steering system.

Braking system 308 may slow down and/or stop mobile utility vehicle 300 in response to commands from machine controller 302. Braking system 308 may be an electrically controlled braking system. This braking system may be, for example, a hydraulic braking system, a friction braking system, or some other suitable braking system that may be electrically controlled.

Watering unit 310 enables mobile utility vehicle 300 to acquire watering solution from a water source, such as water source 110 in FIG. 1, and apply watering solution to an area, such as area 114 in FIG. 1, or a plant or number of plants within an area, such as garden 116, lawn 118, and/or individual plant 120 in FIG. 1. Watering unit 310 includes water supplier connector 328, piping system 330, and watering solution application system 332.

Water supplier connector 328 may be any type of connection port that allows for the attachment of a water supplier, such as water supplier 112 in FIG. 1, for example. Water supplier connector 328 may allow for the connection of an on-board tank, a towed tank, a hose, and/or any other suitable device for carrying watering solution. A hose may be any type of flexible tubing suitable for carrying watering solution. Water supplier connector 328 may contain threads which mate with the threads commonly found at the end of a hose, for example. Water supplier connector 328 may also include a rubber seal to prevent leakage. In an illustrative embodiment, a garden hose may be connected to watering unit 310 using water supplier connector 328. Mobile utility vehicle 300 may then apply watering solution flowing through the hose to an area, such as area 114 in FIG. 1.

Piping system 330 is a number of pipes used to convey watering solution from one location to another in watering unit 310. Piping system 330 may allow watering solution from a water source connected to water supplier connector 328 to flow to water application system 332 for application to an area by mobile utility vehicle 300.

Watering solution application system 332 enables mobile utility vehicle 300 to apply watering solution to a number of areas and/or plants, such as garden 116, lawn 118, and individual plant 120 in FIG. 1. Water application system 332 includes valve system 334 and watering solution applicator 336.

Valve system 334 may include a number of valves for starting and stopping the flow of watering solution. Valve system 334 may be used in conjunction with gravity feed to apply watering solution to a number of areas and/or plants. While gravity feed could be used to water plants, this requires that the watering solution level be above the application level. This may not be suitable for small mobile utility vehicles such as robots, which need to water plants in large pots or pots which are placed above the surrounding area on a pedestal. For plants that are at a level below watering unit 310, valve system 334 is used to allow watering solution to be pulled by gravity and dispersed. For plants that are at a level above watering unit 310, watering solution applicator 336 would allow watering solution to be applied from watering unit 310 to the area or plants being watered, such as, for example, individual plant 120 in FIG. 1. As used herein, a number of areas and/or plants is one or more areas and/or plants.

Watering solution applicator 336 may be any type of watering solution application device that includes a pressure system for forcing watering solution through piping system 330 and out a number of openings of watering solution applicator 336. As used herein, a number of openings refers to one or more openings. For example, watering solution applicator 336 may be, without limitation, a fixed pattern sprinkler, a spray head, a nozzle, an impact sprinkler, an oscillating sprinkler, a pulsating sprinkler, a spout, and any other type of opening that allows for the application of watering solution from a water supplier, such as a garden hose, for example.

Sensor system 312 is a high integrity perception system and may be a set of sensors used to collect information about the environment around a mobile utility vehicle. In these examples, the information is sent to machine controller 302 to provide data in identifying how mobile utility vehicle 300 should apply watering solution, specifically providing data about the number of plants and current conditions in the operating environment. In these examples, a set refers to one or more items. A set of sensors is one or more sensors in these examples.

Communication unit 314 is a high integrity communications system and may provide multiple redundant communications links and channels to machine controller 302 to receive information. The communication links and channels may be heterogeneous and/or homogeneous redundant components that provide fail-safe communication. This information includes, for example, data, commands, and/or instructions.

Communication unit 314 may take various forms. For example, communication unit 314 may include a wireless communications system, such as a cellular phone system, a Wi-Fi wireless system, a Bluetooth wireless system, and/or some other suitable wireless communications system. Further, communication unit 314 also may include a communications port, such as, for example, a universal serial bus port, a serial interface, a parallel port interface, a network interface, and/or some other suitable port to provide a physical communications link. Communication unit 314 may be used to communicate with a remote location, such as remote location 106 in FIG. 1, or an operator.

Data storage device 315 is one example of persistent storage 208 in FIG. 2. Data storage device 315 includes watering solution application plans 338. Watering solution application plans 338 may be generated by mapping/planning/execution processor 326, or may be received from a remote location via download module 316. Watering solution application plans 338 may be stored on data storage device 315, horticultural knowledge base 318, and/or at a remote location. In one advantageous embodiment, watering solution application plans 338 may be generated dynamically by mapping/planning/execution processor 326, stored on data storage device 315, and then saved to a fixed knowledge base for future use by machine controller 302 of mobile utility vehicle 300.

The illustration of mobile utility vehicle 300 in FIG. 3 is not meant to imply physical or architectural limitations on the manner in which different advantageous embodiments may be implemented. Other components in addition or in place of the ones illustrated may be used. Some components may be unnecessary in some advantageous embodiments. Also, the blocks are presented to illustrate some functional components and combined and/or divided into different blocks when implemented in hardware and/or software. For example, in some advantageous embodiments watering unit 310 may be separate and distinct from mobile utility vehicle 300, but capable of being used by mobile utility vehicle 300. As used herein, watering solution refers to water and/or other substances that may be applied to plants. Other substances may be, for example, without limitation, fertilizer, herbicide, insecticide, fungicide, plant food, and the like.

Figure 4:
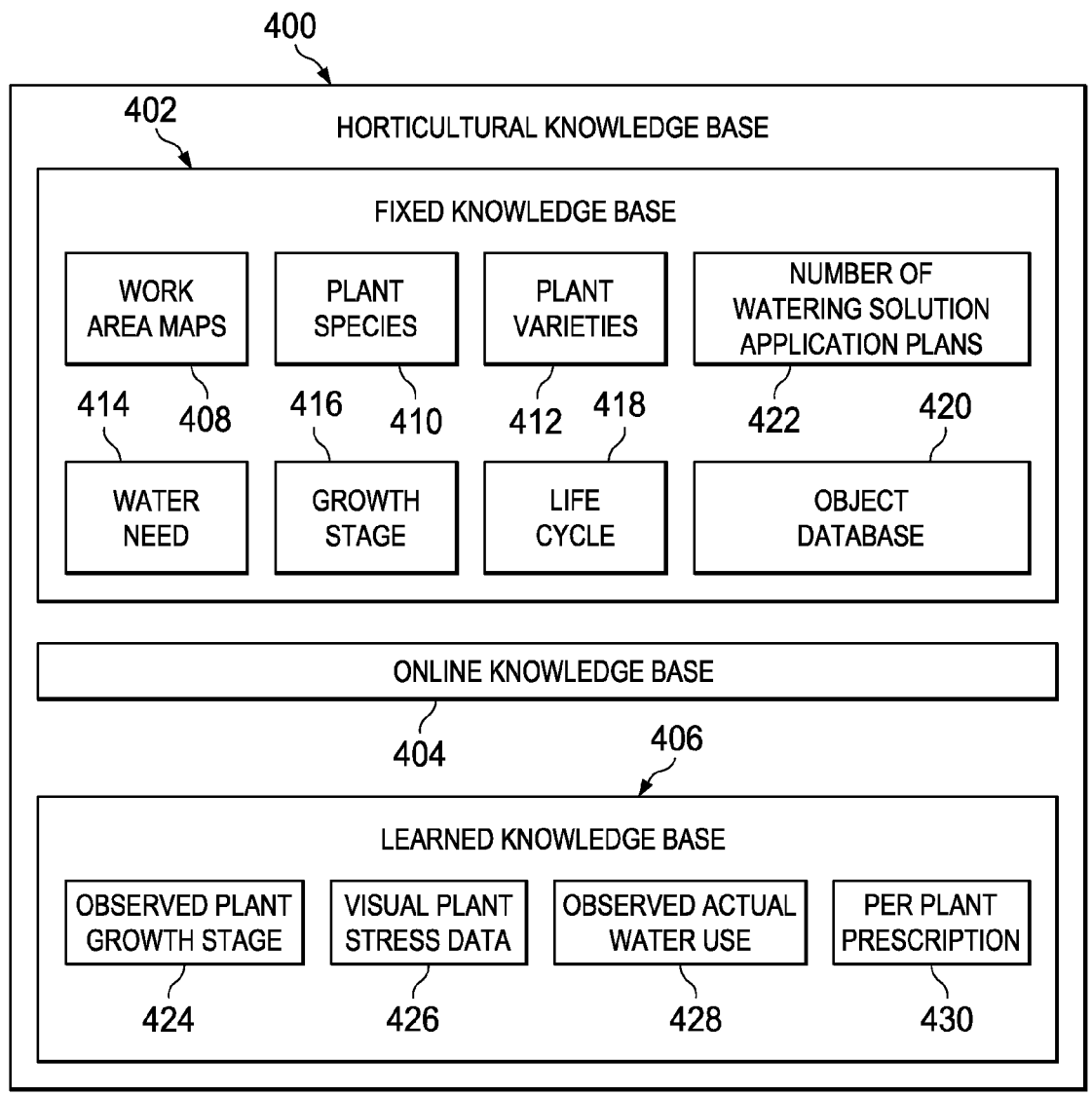
FIG. 4 is a block diagram of a horticultural knowledge base in accordance with an illustrative embodiment.

With reference now to FIG. 4, a block diagram of a horticultural knowledge base is depicted in accordance with an illustrative embodiment. Horticultural knowledge base 400 is an example of a knowledge base component of a machine controller, such as horticultural knowledge base 318 of mobile utility vehicle 300 in FIG. 3. For example, horticultural knowledge base 400 may be, without limitation, a component of a navigation system, an autonomous machine controller, a semi-autonomous machine controller, or may be used to make water management decisions regarding operating environment activities and coordination activities.

In these illustrative examples, horticultural knowledge base 400 includes fixed knowledge base 402, online knowledge based 404, and learned knowledge base 406.

Fixed knowledge base 402 contains static information about the operating environment of a mobile utility vehicle. Fixed knowledge base 402 includes work area maps 408, plant species 410, plant varieties 412, water need 414, growth stage 416, life cycle 418, object database 420, and watering solution application plans 422. Work area maps 408 contains information about the operating environment of a mobile utility vehicle such as, without limitation, a fixed map showing the landscape, structures, tree locations, flowerbed locations, individual plant locations, and other static object locations. Work area maps 408 may also contain geo-referenced maps of an area with indicators for the location of individual plants, gardens, lawns, driveways, sidewalks, and the like, for example. Work area maps 408 may also indicate specific areas to water and not water. For example, in an illustrative embodiment, a geo-referenced map may contain labeled location of a garden, a lawn, and a sidewalk, where the label for the garden and the lawn indicate "water" and the label for the sidewalk indicates "do not water."

Plant species 410 contains information about the characteristics of various plant species. For example, characteristics of various plant species may be, without limitation, trunk, bark, branching system, stem size, leaf pattern, budding, non-budding, color, growth pattern, preferred sunlight, preferred soil moisture, preferred soil pH, and the like. Plant varieties 412 contain information about the characteristics of the different plant varieties or cultivars of the various plant species found in plant species 410. For example, characteristics of different plant varieties or cultivars of the various plant species may be, without limitation, color, size, growth pattern, budding pattern, preferred sunlight, preferred soil moisture, preferred soil pH, and the like. A cultivar is a cultivated plant that has been selected and given a unique name because of its decorative or useful characteristics. A cultivar is usually distinct from similar plants and when propagated it retains those characteristics.

In an illustrative embodiment, some examples of various characteristics of preferred soil moisture may be, without limitation, more water than average rainfall for the year, more water during growth stage, no water during dormancy period, well-drained soil, and the like. In another illustrative embodiment, some examples of various characteristics of color and size may be, without limitation, green leaves with white margins, green leaves with irregular wide light yellow margins, chartreuse to gold leaves with dark green margins, dark blue leaves with yellow shades, large leaves chartreuse to gold, green leaves with wide gold centers and white streaks between, and the like.

Water need 414 contains information about the typical water needs associated with each plant species and plant variety or cultivar found in plant species 410 and plant varieties 412, according to the growth stage and life cycle of the plant. Growth stage 416 contains information about the typical growth stages associated with each plant species and plant variety found in plant species 410 and plant varieties 412. Life cycle 418 contains information about the typical life cycles associated with each plant species and plant variety found in plant species 410 and plant varieties 412. For example, life cycle 418 may indicate whether a particular plant species or variety is an annual or a perennial. Perennials, especially small flowering plants, grow and bloom over the spring and summer die back every autumn and winter, then return in the spring from their root-stock. Annuals will typically germinate, flower, and die within one year, unless they are prevented from setting seed. Some seedless plants can also be considered annuals even though they do not flower. The life cycle of an individual plant varies and depends upon the point in the growing season as well as the type of plant species and variety.

Object database 420 contains fixed information about objects that may be identified in an operating environment, which may be used to classify identified objects in the environment. This fixed information may include attributes of classified objects, for example, an identified object with attributes of tall, narrow, vertical, and cylindrical, may be associated with the classification of "tree trunk." Fixed knowledge base 402 may contain further fixed operating environment information. Fixed knowledge base 402 may be updated based on information from learned knowledge base 406.

Number of watering solution application plans 422 may include watering solution application plans generated by mapping/planning/execution processor 326 in FIG. 3, received from a remote location via download module 316 in FIG. 3, or retrieved over the internet using online knowledge base 404, for example. As used herein, a number refers to one or more watering solution application plans. Number of watering solution application plans 422 may be stored in fixed knowledge base 402 for use by a machine controller of a mobile utility vehicle, such as machine controller 302 of mobile utility vehicle 300 in FIG. 3. In one advantageous embodiment, number of watering solution application plans 422 may be plans previously generated by mapping/planning/execution processor 326 in FIG. 3 and saved to fixed knowledge base 402 for future and/or repeat use by machine controller 302 of mobile utility vehicle 300 in FIG. 3. In some advantageous embodiments, mapping/planning/execution processor 326 may select a watering solution application plan from number of watering solution application plans 422 according to current needs and constraints for a particular area.

Online knowledge base 404 may be accessed with a communications unit, such as communications unit 314 in FIG. 3, to wirelessly access the Internet. Online knowledge base 404 dynamically provides information to a machine control process which enables adjustment to sensor data processing, site-specific sensor accuracy calculations, and/or exclusion of sensor information. For example, online knowledge base 404 may include, without limitation, current weather conditions of the operating environment, current constraints for the operating environment, weather forecasts for the operating environments, and/or any other suitable information. Current constraints may include a number of constraints, such as, without limitation, current water rules for a location, water shortage information, water restrictions imposed upon a certain location, and/or the amount of water currently accessible to a mobile utility vehicle, such as mobile utility vehicle 104 in FIG. 1, from available water sources, such as water sources 110 in FIG. 1.

In some examples, online knowledge base 404 may be a remotely accessed knowledge base. This weather information may be used by machine controller 302 in FIG. 3 to determine which sensors to activate in order to acquire accurate environmental data for the operating environment. Weather, such as rain, snow, fog, and frost may limit the range of certain sensors, and require an adjustment in attributes of other sensors in order to acquire accurate environmental data from the operating environment. Other types of information that may be obtained include, without limitation, vegetation information, such as foliage deployment, leaf drop status, and lawn moisture stress.

Learned knowledge base 406 may be a separate component of horticultural knowledge base 400, or alternatively may be integrated with fixed knowledge base 402 in an illustrative embodiment. Learned knowledge base 406 contains knowledge learned as the mobile utility vehicle spends more time in a specific work area, and may change temporarily or long-term depending upon interactions with online knowledge base 404 and user input. Learned knowledge base includes observed plant growth stage 424, visual plant stress data 426, observed actual water use 428, and per plant prescription 430. Observed plant growth stage 424 contains information collected by a sensor system, such as sensor system 312 in FIG. 3, detecting the actual plant growth stage of an individual plant, such as individual plant 120 in FIG. 1. The information in observed plant growth stage 424 may be compared to the typical plant growth stage information located in growth stage 416, and used to adjust the treatment and water application to an individual plant. Visual plant stress data 426 contains information collected by a sensor system about an individual plant that is in distress or shows visual signs of stress. The information in visual plant stress data 426 can be used to adjust the treatment and water application of the individual plant in order to address the plant stress observed.

Observed actual water use 428 contains information collected by a sensor system about soil moisture, water retention, and actual amount of water applied. Observed actual water use 428 is learned information about the actual water use of an individual plant that can be used by a processing system, such as machine controller 302 in FIG. 3, to adjust the amount of water applied in future water use applications.

Per plant prescription 430 contains information about the amount of water and/or other substances that should be applied to each individual plant, such as individual plant 120 in FIG. 1. Other substances may be, for example, without limitation, fertilizer, plant food, pesticide, and the like. In one illustrative embodiment, per plant prescription 430 is transmitted to a mobile utility vehicle, such as mobile utility vehicle 300 in FIG. 3, either through download module 316 or communications unit 314 in FIG. 3. In another illustrative embodiment, per plant prescription 430 is calculated by a processing system, such as machine controller 302 in FIG. 3, using the learned data from observed plant growth stage 424, visual plant stress data 426, and observed actual water use 428, as well as the fixed data from fixed knowledge base 402. A mobile utility vehicle, such as mobile utility vehicle 300 in FIG. 3, fulfills per plant prescription 430 by moving within the operating environment to obtain water from a water source, such as water source 110 in FIG. 1, and apply the water to a number of areas and/or plants, such as garden 116, lawn 118, and individual plant 120 in FIG. 1. Per plant prescription 430 may be instructions for applying a specific amount of water and/or other substances to a number of plants. As used herein, per plant refers to one or more individual plants. In these examples, per plant prescription 430 may be directed to an individual plant, such as individual plant 120 in FIG. 1, or may be directed to a number of plants, such as garden 116 or lawn 118 in FIG. 1.

In another illustrative example, learned knowledge base 406 may detect the absence of a tree that was present the last time it received environmental data from the work area. Learned knowledge base 406 may temporarily change the environmental data associated with the work area to reflect the new absence of a tree, which may later be permanently changed upon user input confirming the tree was in fact cut down. Learned knowledge base 406 may learn through supervised or unsupervised learning.

The information in horticultural knowledge base 400 may be used to perform classification and plan actions for managing water use. Horticultural knowledge base 400 may be located entirely in a mobile utility vehicle, such as mobile utility vehicle 300 in FIG. 3, or parts or all of horticultural knowledge base 400 may be located in a remote location, such as remote location 106 in FIG. 1, which is accessed by a mobile utility vehicle.

Figure 5:
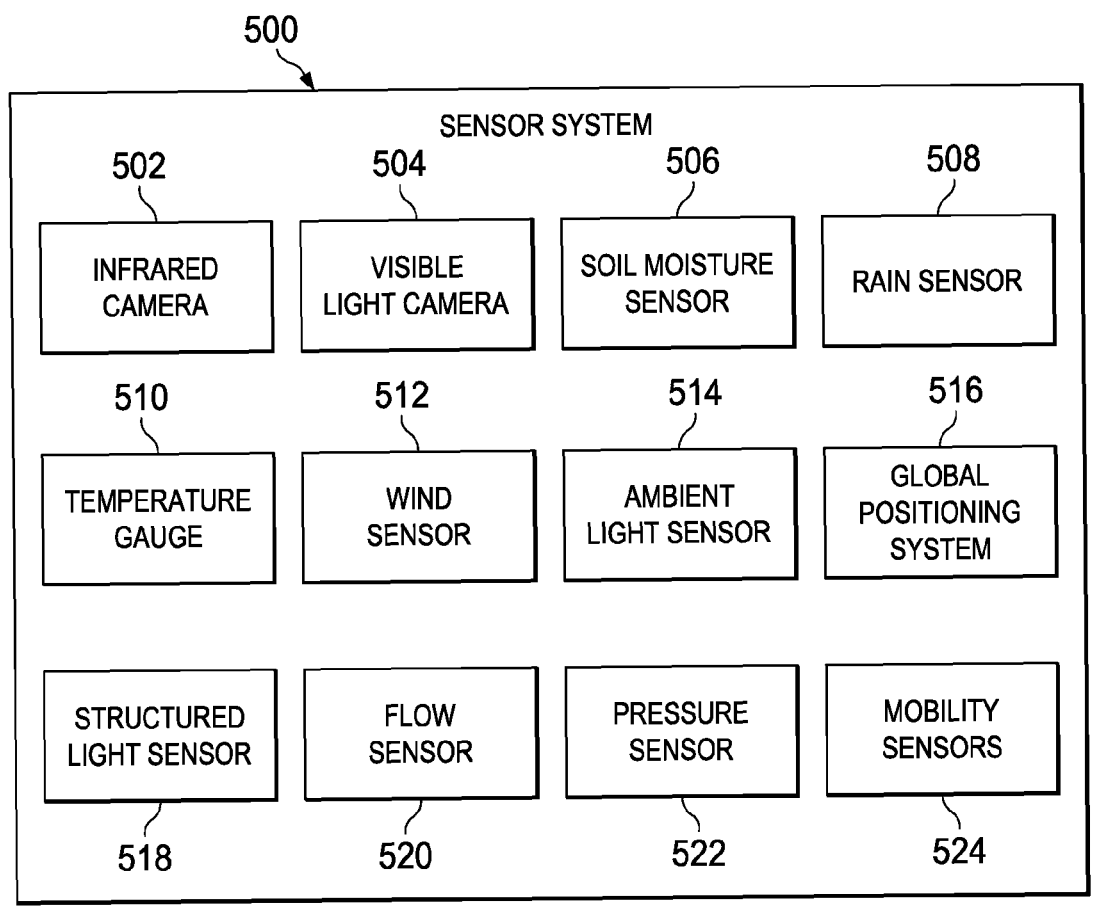
FIG. 5 is a block diagram of a sensor system in accordance with an illustrative embodiment.

With reference now to FIG. 5, is a block diagram of a sensor system is depicted in accordance with an illustrative embodiment. Sensor system 500 is an example of one implementation of sensor system 312 in FIG. 3.

As illustrated, sensor system 500 includes, for example, infrared camera 502, visible light camera 504, soil moisture sensor 506, rain sensor 508, temperature gauge 510, wind sensor 512, ambient light sensor 514, global positioning system 516, structured light source 518, flow sensor 520, pressure sensor 522, and mobility sensors 524. These different sensors may be used to identify the operating environment around a mobile utility vehicle. The sensors in sensor system 500 may be selected such that one of the sensors is always capable of sensing information needed to operate the mobile utility vehicle in different operating environments.

Infrared camera 502 may form an image using infrared radiation. Visible light camera 504 may be a standard still-image camera, which may be used alone for color information or with a second camera to generate stereoscopic, or three-dimensional, images. When visible light camera 504 is used along with a second camera to generate stereoscopic images, the two or more cameras may be set with different exposure settings to provide improved performance over a range of lighting conditions. Visible light camera 504 may also be a video camera that captures and records moving images.

The infrared images from infrared camera 502 and visible light camera 504 may be processed using means known in the art to identify plant species and assess plant health.

Soil moisture sensor 506 detects the current in situ soil moisture information from specific portions of the operating environment.

Rain sensor 508 detects precipitation on an exterior surface of the mobile utility vehicle. In one embodiment, rain sensor 508 includes an infrared beam and an infrared sensor. In this illustrative example, rain sensor 508 operates by beaming an infrared light at a 45-degree angle into a windshield of the mobile utility vehicle from the inside of the mobile utility vehicle. If the windshield is wet, less light makes it back to the sensor, indicating the presence of moisture on the windshield and the likelihood of rain. The illustrative embodiment is not meant to limit the architecture of rain sensor 508. Other rain detection technologies may be used without departing from the spirit and scope of the invention.

Temperature gauge 510 detects the ambient temperature of the operating environment. Wind sensor 512 detects the wind speed in an operating environment. In an illustrative embodiment, temperature gauge 510 and wind sensor 512 are optional features of sensor system 500. The information detected by temperature gauge 510 and wind sensor 512 may alternatively be received from an online knowledge base, such as online knowledge base 404 in FIG. 4. Ambient light sensor 514 measures the amount of ambient light in the operating environment.

Global positioning system 516 may identify the location of the mobile utility vehicle with respect to other objects in the environment. Global positioning system 516 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionospheric conditions, satellite constellation, and signal attenuation from vegetation.

Structured light sensor 518 emits light in a pattern, such as one or more lines, reads back the reflections of light through a camera, and interprets the reflections to detect and measure objects in the environment. Structured light sensor 518 may be used to detect obstacles or objects in an environment.

Flow sensor 520 measures the water flow through the watering unit, such as watering unit 108 in FIG. 1 or watering unit 310 in FIG. 3. Pressure sensor 522 measures the water pressure in the watering unit.

Mobility sensors 524 are used to safely and efficiently move a mobile utility vehicle, such as mobile utility vehicle 300 in FIG. 3, within a worksite, such as area 114 in FIG. 1, for example. Mobility sensors 524 may include, for example, without limitation, an odometer, a compass for dead reckoning, vision and ultrasonic sensors for obstacle/object detection, and/or any other suitable sensor.

In an illustrative embodiment, sensor system 500 receives data from soil moisture sensor 506 identifying the soil moisture of specific portions of the operating environment. The information about the soil moisture is processed by a processor, such as machine controller 402 in FIG. 3, and optionally displayed to an operator through user interface 320 in FIG. 3. In one illustrative example, user input may be received to adjust a per plant prescription for the individual plant or plants in the specific portion of the operating environment. The user input is then used by a machine controller, such as machine controller 302 in FIG. 3, to determine which commands to send to the mobile utility vehicle's water application system.

In another illustrative embodiment, machine controller 302 in FIG. 3 receives the soil moisture data from sensor system 500, and interacts with horticultural knowledge base 318 in FIG. 3 in order to determine which commands to send to the mobile utility vehicle's water application system.

Sensor system 500 may be a set of sensors used to collect information about the environment around a mobile utility vehicle as well as the condition of a number of individual plants and the condition of an area containing a number of plants. In these examples, a set refers to one or more items. A set of sensors is one or more sensors in these examples.

Figure 6:
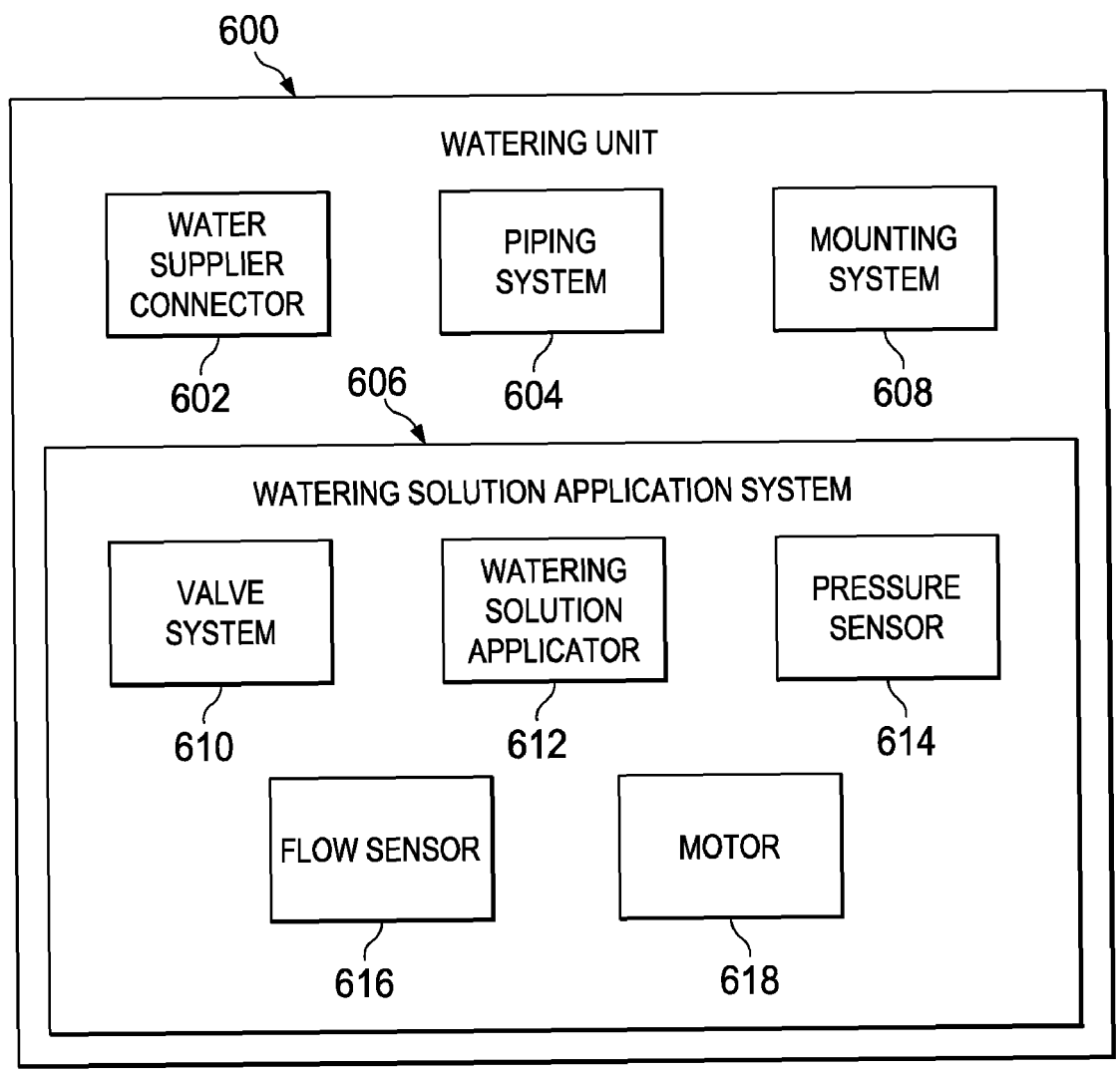
FIG. 6 is a block diagram of a watering unit in accordance with an illustrative embodiment.

With reference now to FIG. 6, a block diagram of a watering unit is depicted in accordance with an illustrative embodiment. Watering unit 600 may be an example of watering unit 108 in FIG. 1. Watering unit 600 may also be an example of watering unit 310 in FIG. 3. In one illustrative embodiment, watering unit 600 may be independent from a mobile utility vehicle, but capable of being mounted on a mobile platform, such as mobile utility vehicle 300 in FIG. 3. In another illustrative embodiment, watering unit 600 may be integrated with a mobile platform, such as mobile utility vehicle 300 in FIG. 3.

Watering unit 600 enables watering solution application to an area, such as area 114 in FIG. 1, or a plant or number of plants within an area, such as garden 116, lawn 118, and/or individual plant 120 in FIG. 1. Watering unit 600 includes water supplier connector 602, piping system 604, watering solution application system 606, and mounting system 608.

Water supplier connector 602 may be any type of connection port that allows for the attachment of a water supplier, such as water supplier 112 in FIG. 1, for example. Water supplier connector 602 may allow for the connection of an on-board tank, a towed tank, a hose, and/or any other suitable device for carrying watering solution. A hose may be any type of flexible tubing suitable for carrying watering solution. For example, water supplier connector 602 may contain threads which mate with the threads commonly found at the end of a hose, for example. Water supplier connector 602 may also include a rubber seal to prevent leakage. In an illustrative embodiment, a garden hose may be connected to watering unit 600 using water supplier connector 602.

Piping system 604 is a number of pipes used to convey watering solution from one location to another in watering unit 600. Piping system 604 may allow watering solution from a water source connected to water supplier connector 602 to flow to watering solution application system 606 for application to an area by watering unit 600. As used herein, a number of pipes refers to one or more pipes.

Watering solution application system 606 enables watering unit 600 to apply watering solution to a number of areas and/or plants, such as garden 116, lawn 118, and individual plant 120 in FIG. 1. Watering solution application system 606 includes valve system 610, watering solution applicator 612, pressure sensor 614, flow sensor 616, and motor 618.

Valve system 610 may include a number of valves for starting and stopping the flow of watering solution. Valve system 610 may be used in conjunction with gravity feed to apply watering solution to a number of areas and/or plants. While gravity feed could be used to water plants, this requires that the watering solution level be above the application level. This may not be suitable for small mobile utility vehicles such as robots, which need to water plants in large pots or pots which are placed above the surrounding area on a pedestal. For plants that are at a level below watering unit 600, valve system 610 is used to allow watering solution to be pulled by gravity and dispersed. For plants that are at a level above watering unit 600, watering solution applicator 612 would allow watering solution to be applied from watering unit 600 to the area or plants being watered, such as, for example, individual plant 120 in FIG. 1. As used herein, a number of areas and/or plants is one or more areas and/or plants.

Watering solution applicator 612 may be any type of watering solution application device that includes a pressure system for forcing watering solution through piping system 604 and out a number of openings of watering solution applicator 612. As used herein, a number of openings refers to one or more openings. For example, watering solution applicator 612 may be, without limitation, a fixed pattern sprinkler, a spray head, a nozzle, an impact sprinkler, an oscillating sprinkler, a pulsating sprinkler, a spout, and any other type of opening that allows for the application of watering solution from a water source, such as a garden hose.

Pressure sensor 614 measures the water pressure in watering unit 600. Flow sensor 616 measures the water flow through watering unit 600. Motor 618 is an optional component that may be used in conjunction with an oscillating sprinkler watering solution applicator, for example. In the illustrative example of an oscillating sprinkler, watering solution applicator 612 will need to move back and forth in a controlled manner in order to apply watering solution in the designated area. Motor 618 controls the movement of watering solution applicator 612 in this illustrative example. Motor 618 may be, for example, without limitation, a stepper motor. A stepper motor is a brushless, synchronous electric motor that can divide a full rotation into a large number of steps. The position of the motor can be controlled precisely, without any feedback mechanism.

Mounting system 608 is used to optionally mount watering unit 600 on a mobile platform, such as mobile utility vehicle 300 in FIG. 3, for example. Mounting system 608 is used to optionally mount watering unit 600 on a mobile platform, such as mobile utility vehicle 300 in FIG. 3, for example. Mounting system 608 may include, for example, without limitation, an attachment harness, a rotatable attachment post, and/or some other suitable attachment capabilities. An attachment harness may be used for coupling watering unit 600 to mobile utility vehicle 300 in FIG. 3. The attachment harness may be in the form of a bearing surface, and may include an attachment post that is rotatable within the bearing surface in the mobile platform around a vertical axis.

Figure 7:
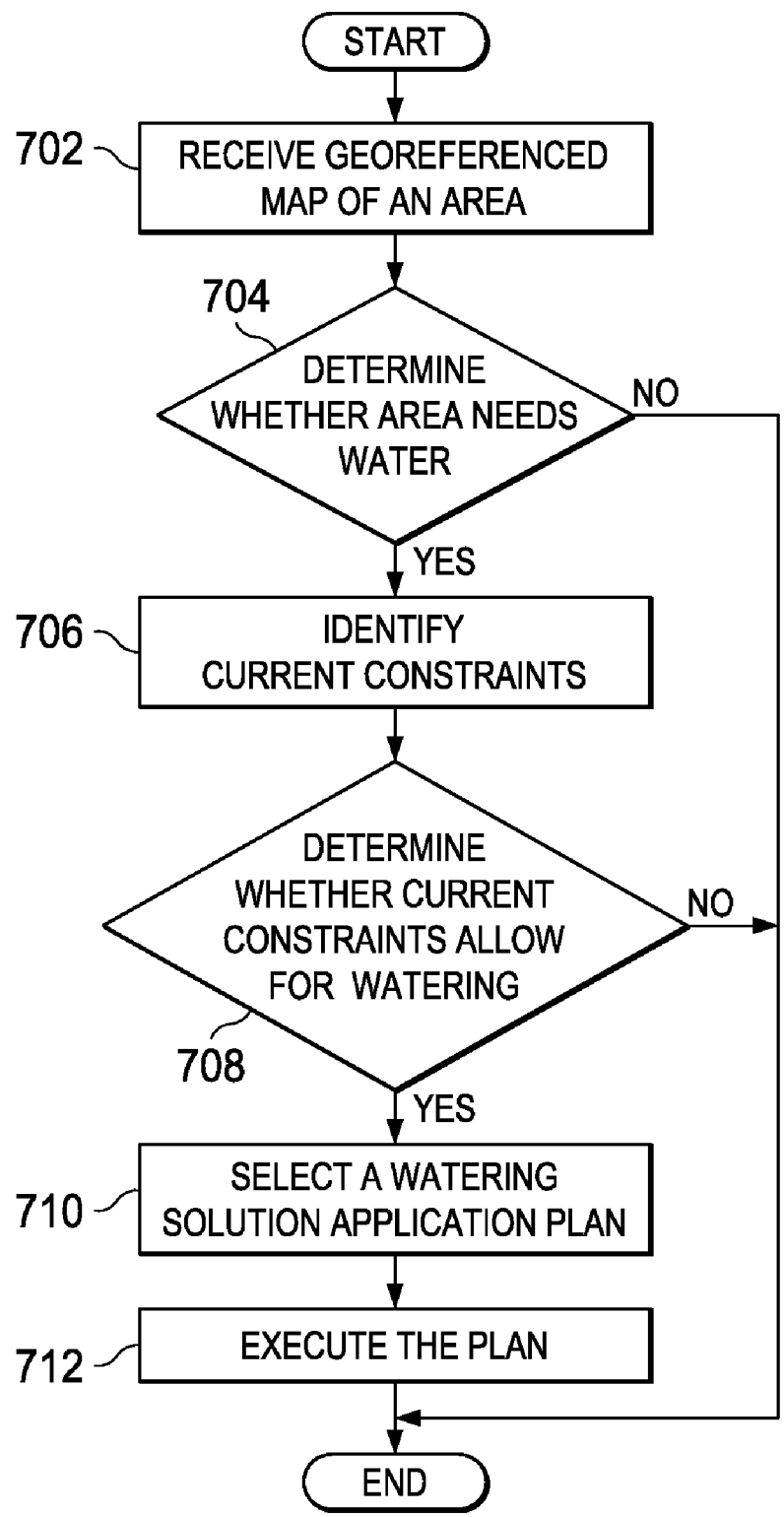
FIG. 7 is a flowchart illustrating a process for robotic watering in accordance with an illustrative embodiment.

With reference now to FIG. 7, a flowchart illustrating a process for robotic watering is depicted in accordance with an illustrative embodiment. The process in FIG. 7 may be implemented by mapping/planning/execution processor 326 in machine controller 302 in FIG. 3.

The process begins by receiving a geo-referenced map of an area (step 702). The geo-referenced map may be received from a knowledge base, for example, such as horticultural knowledge base 400 in FIG. 4. The process determines whether an area needs water (step 704). In one illustrative example, this determination may be made using the geo-referenced map with labels on specific areas to water and not to water. In another illustrative example, this determination may be made using information received from a sensor system, such as sensor system 500 in FIG. 5, about an area and/or individual plants within an area that is to be watered. If the process determines that the area does not need water, the process terminates.

If the process determines that the area needs water, the process then identifies current constraints (step 706) for the area. The process may access a database, such as horticultural knowledge base 318 in FIG. 3, in order to identify current constraints. Current constraints may include a number of constraints, such as, without limitation, current water rules for a location, water shortage information, water restrictions imposed upon a certain location, and/or the amount of water currently accessible to a mobile utility vehicle, such as mobile utility vehicle 104 in FIG. 1, from available water sources, such as water sources 110 in FIG. 1.

Next, the process determines whether current constraints allow for watering (step 708). For example, municipal water sources may be unavailable due to water restrictions or shortages. In another illustrative example, water may be available for use in a lawn or garden area only at certain times of the day or on certain dates due to water restrictions, shortages, or conservation efforts. If the process determines current constraints do not allow for watering, the process terminates.

If the process determines current constraints allow for watering, the process then selects a watering solution application plan (step 710). In an illustrative embodiment, the process may select that a watering solution application plan be dynamically generated by a planning component, such as mapping/planning/execution processor 326 in FIG. 3, based on the currently identified needs and/or constraints. In another illustrative embodiment, the watering solution application plan may be selected from a number of previously generated plans, such as number of watering solution application plans 422 in FIG. 4, based on the currently identified needs and/or constraints. In yet another illustrative embodiment, the watering solution application plan may be selected from a number of previously generated plans, and then dynamically adjusted to fit the current needs and/or constraints identified.

Current needs may be identified using information such as, for example, without limitation, observed plant growth stage, visual plant stress data, observed actual water use, per plant prescription, water needs based on growth stage and/or life cycle, and/or any other suitable information obtained about the area to be watered. The plan may include considerations for factors such as, but not limited to, the amount of water available, the length of the water source connected to the watering unit, the distance of the number of areas and/or plants to be watered, the number of areas/and or plants to be watered, watering restrictions and/or water rules in effect, and the like. The process then executes the plan (step 712), with the process terminating thereafter.

The process may execute the plan by sending commands to components of a mobile utility vehicle and/or a water application system. For example, the process may generate a plan for applying water to a number of plants. The process may send commands to a propulsion system and steering system, such as propulsion system 304 and steering system 306 in FIG. 3, to direct a mobile utility vehicle with a water application system, such as water application system 322 in FIG. 3, to the number of plants identified as having a watering need. The process may then send commands to the water application system to release water and direct the water onto the number of plants. In this example, the process executes the generated plan.

Figure 8:
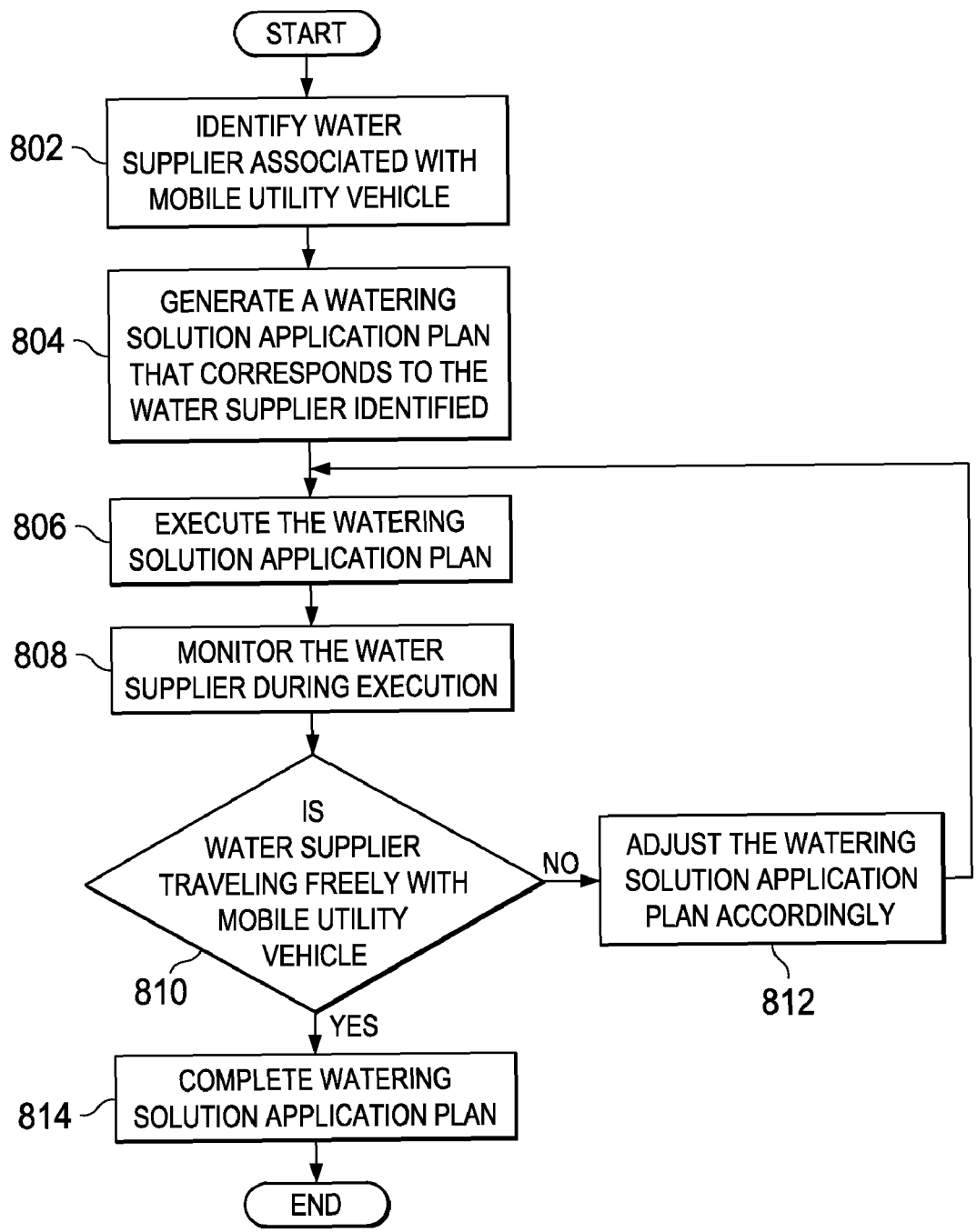
FIG. 8 is a flowchart illustrating a process for executing a watering solution application plan in accordance with an illustrative embodiment.

With reference now to FIG. 8, a flowchart illustrating a process for executing a watering solution application plan is depicted in accordance with an illustrative embodiment. The process in FIG. 8 may be implemented by components such as mapping/planning/execution processor 326 and structured light generator processor 324 in machine controller 302 in FIG. 3.

The process begins by identifying a water supplier associated with a mobile utility vehicle (step 802). The water supplier may be a water supplier such as, for example, water supplier 112 in FIG. 1. The process generates a watering solution application plan that corresponds to the water supplier identified (step 804). For example, if the water supplier identified is a garden hose, the process may generate a watering solution application plan that accounts for the path of travel for the garden hose as the mobile utility vehicle moves from one location to another within an area. In this illustrative example, the plan may account for factors such as, for example, obstacles, length of the hose, number of locations to be watered, distance of each location to be watered, and/or any other suitable factors for path planning. In some advantageous embodiments, the process may select a watering solution application plan from a number of watering solution application plans previously generated rather than generating a new watering solution application plan.

Next, the process executes the watering solution application plan (step 806). The process may execute the plan by sending commands to components of a mobile utility vehicle and/or a water application system. The process monitors the water supplier during execution (step 808). In the illustrative example of the garden hose, the water supplier may be monitored by a component of the machine controller such as structured light generator processor 324 in FIG. 3, which may detect the hose within the grass and/or other terrain along the path of the watering solution application plan execution.

The process determines whether the water supplier is traveling freely with the mobile utility vehicle (step 810). For example, during monitoring of the water supplier, the process may determine whether the water supplier has encountered an obstacle, such as a garden hose becoming tangled around a tree. In another illustrative example, the process may determine whether a water supplier, such as a garden hose, has developed a kink that prevents the flow of a watering solution to the mobile utility vehicle. In yet another illustrative example, the process may determine whether a water supplier, such as a towed tank, has become entangled or otherwise impeded by terrain and/or other objects in the environment.

If the process determines that the water supplier is not moving freely with the mobile utility vehicle, the process then adjusts the watering solution application plan accordingly (step 812) in order to resolve the issue preventing the water supplier from traveling freely, and returns to step 806 to continue executing the watering solution application plan. For example, if the path of travel of the mobile utility vehicle from one location to another resulted in the water supplier encountering an obstacle that prevented the water supplier from traveling freely with the mobile utility vehicle, the process may redirect the mobile utility vehicle to maneuver around the obstacle in such a way that allows the water supplier to continue traveling freely to the next location with the mobile utility vehicle.

If the process determines that the water supplier is traveling freely with the mobile utility vehicle, the process completes the watering solution application plan (step 814), with the process terminating thereafter.

The process described in FIG. 8 is not meant to imply physical or architectural limitations on the manner in which different advantageous embodiments may be implemented.

Other steps in addition or in place of the ones illustrated may be used. Some steps may be unnecessary in some advantageous embodiments. For example, in some advantageous embodiments step 810 may be iteratively used until the watering application plan is complete. As used herein, watering solution refers to water and/or other substances that may be applied to plants. Other substances may be, for example, without limitation, fertilizer, herbicide, insecticide, fungicide, plant food, and the like.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments recognize a need for autonomous water application capable of adjusting water application as needed. In particular, the illustrative embodiments recognize a need for an autonomous system that is capable of managing water restrictions and adjusting water application based on observed and/or calculated needs for water. In an advantageous embodiment, these systems permit a maximum utility of available water for a plurality of plants with minimum maintenance.

The illustrative embodiments recognize that current methods provided for watering require manually standing with a hose and directing the application of water, manually placing a sprinkler that must be manually moved to apply water to an entire area, of employing an automatic sprinkler system that is costly and inflexible to changes such as water restrictions or individual plant needs.

Therefore, the illustrative embodiments provide a method and system for watering plants. A map of an area is received and a determination is made using a processing unit as to whether the area needs water. If the area needs water, current constraints are identified and a determination is made using the processing system as to whether the current constraints allow for watering. If the current constraints allow for watering, a watering solution application plan is generated using the processing system, and the watering solution application plan is executed using a mobile utility vehicle.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for watering plants, the method comprising:
responsive to receiving a map of an area, determining whether the area needs water using a processing unit;
responsive to a determination that the area needs water, identifying current constraints;
determining whether the current constraints identified allow for watering in the area using the processing system;
responsive to a determination that the current constraints allow for watering in the area, generating a water application plan using the processing system; and
executing the water application plan using a mobile utility vehicle.

2. The method of claim 1, wherein the current constraints are selected from a list of at least one of current water rules for a location, water shortage information, water restrictions imposed upon the location, and an amount of water currently available to a mobile utility vehicle.

3. The method of claim 1, wherein generating the water application plan using the processing system further comprising:
identifying a water supplier associated with the mobile utility vehicle; and
generating the watering solution application plan that corresponds to the water supplier identified.

4. The method of claim 3, wherein the water supplier comprises at least one of an on-board tank, a towed tank, and a hose.

5. The method of claim 3, wherein executing the water application plan further comprises:
monitoring the water supplier; and
determining whether the water supplier is moving with the mobile utility vehicle.

6. The method of claim 5, further comprising:
responsive to a determination that the water supplier is not moving with the mobile utility vehicle, adjusting the watering solution application plan accordingly.

7. The method of claim 5, further comprising:
responsive to a determination that the water supplier is moving with the mobile utility vehicle, completing the watering solution application plan.

* * * * *